United States Patent
Bailey et al.

(10) Patent No.: US 6,274,044 B1
(45) Date of Patent: Aug. 14, 2001

(54) CLARIFIER WITH INFLUENT WELL SCUM REMOVAL

(75) Inventors: Elena Bailey; Robert Shurtleff, both of Austin, TX (US)

(73) Assignee: Enviroquip, Inc., Austin, TX (US)

( * ) Notice: Subject to any disclaimer, the term of this patent is extended or adjusted under 35 U.S.C. 154(b) by 0 days.

(21) Appl. No.: 09/584,655

(22) Filed: May 30, 2000

Related U.S. Application Data

(63) Continuation-in-part of application No. 09/232,235, filed on Jan. 19, 1999, now Pat. No. 6,068,134.

(51) Int. Cl.$^7$ .................................................. B01D 21/08
(52) U.S. Cl. .......................... 210/608; 210/749; 210/764; 210/804; 210/525
(58) Field of Search .................................. 210/608, 749, 210/764, 804, 519, 525, 540

(56) References Cited

U.S. PATENT DOCUMENTS

| | | |
|---|---|---|
| 1,892,688 | 1/1933 | Keefer . |
| 2,262,412 | 11/1941 | Weinig . |
| 2,295,982 | 9/1942 | Widman . |
| 2,506,927 | 5/1950 | Kelly . |
| 2,661,094 | 12/1953 | Stewart . |
| 2,681,151 | 6/1954 | Coulter . |
| 2,798,041 | 7/1957 | Thompson . |
| 2,801,007 | 7/1957 | Thompson . |
| 2,822,928 | 2/1958 | Wormser . |
| 2,875,697 | 3/1959 | Fernstrom . |
| 3,034,456 * | 5/1962 | Reed ..................................... 210/608 |
| 3,056,749 * | 10/1962 | Griffith ................................ 210/608 |
| 3,132,733 | 5/1964 | Boman . |
| 3,166,502 | 1/1965 | Kelly . |
| 3,206,036 | 9/1965 | Hawley . |
| 3,216,570 | 11/1965 | Cunetta . |
| 3,234,880 | 2/1966 | Hampton . |
| 3,314,547 | 4/1967 | Kivell . |
| 3,327,867 | 6/1967 | Hikes . |
| 3,396,102 | 8/1968 | Forrest . |
| 3,487,017 | 12/1969 | Thorn . |
| 3,526,591 | 9/1970 | Hampton . |
| 3,770,131 | 11/1973 | Davis . |
| 3,892,666 | 7/1975 | Quast . |
| 3,926,805 | 12/1975 | Walker . |
| 4,193,877 | 3/1980 | Lillywhite . |
| 4,858,065 * | 8/1989 | Keeter et al. ......................... 210/804 |
| 5,089,118 * | 2/1992 | Mahoney ............................. 210/525 |
| 5,219,470 | 6/1993 | Bradley . |
| 5,614,098 * | 3/1997 | Shao et al. ........................... 210/608 |

\* cited by examiner

*Primary Examiner*—Christopher Upton
(74) *Attorney, Agent, or Firm*—Thomas M. Freiburger

(57) ABSTRACT

A clarifier in a sewage treatment process includes efficient scum removal within the influent well, with discharge of the scum and other floatables as a dedicated waste stream separate from return activated sludge and biological scum collected in the clarifier. Foam contained within the influent well may be treated with bacteria-killing agents or with anti-foaming agents. In one embodiment the scum removal system has an inclined scum ramp at the leading edge of each of two scum removal troughs, with a forward edge below the liquid surface. The scum troughs pass through an arc of rotation, building up scum, which accumulates and is pushed forward by the scum ramp. At least once per revolution, the moving scum ramp approaches a stationary scum surface blade that extends partially under the liquid surface and provides a barrier to the forwardly pushed scum. This blade contacts and slides up the ramp, sweeping the is scum up the ramp and into the scum trough. The described arrangement greatly reduces the amount of free water with the collected effluent scum as compared to the typical designs and permits scum and gross floatables from the influent well to be trapped and contained and discharged and treated separately.

1 Claim, 4 Drawing Sheets

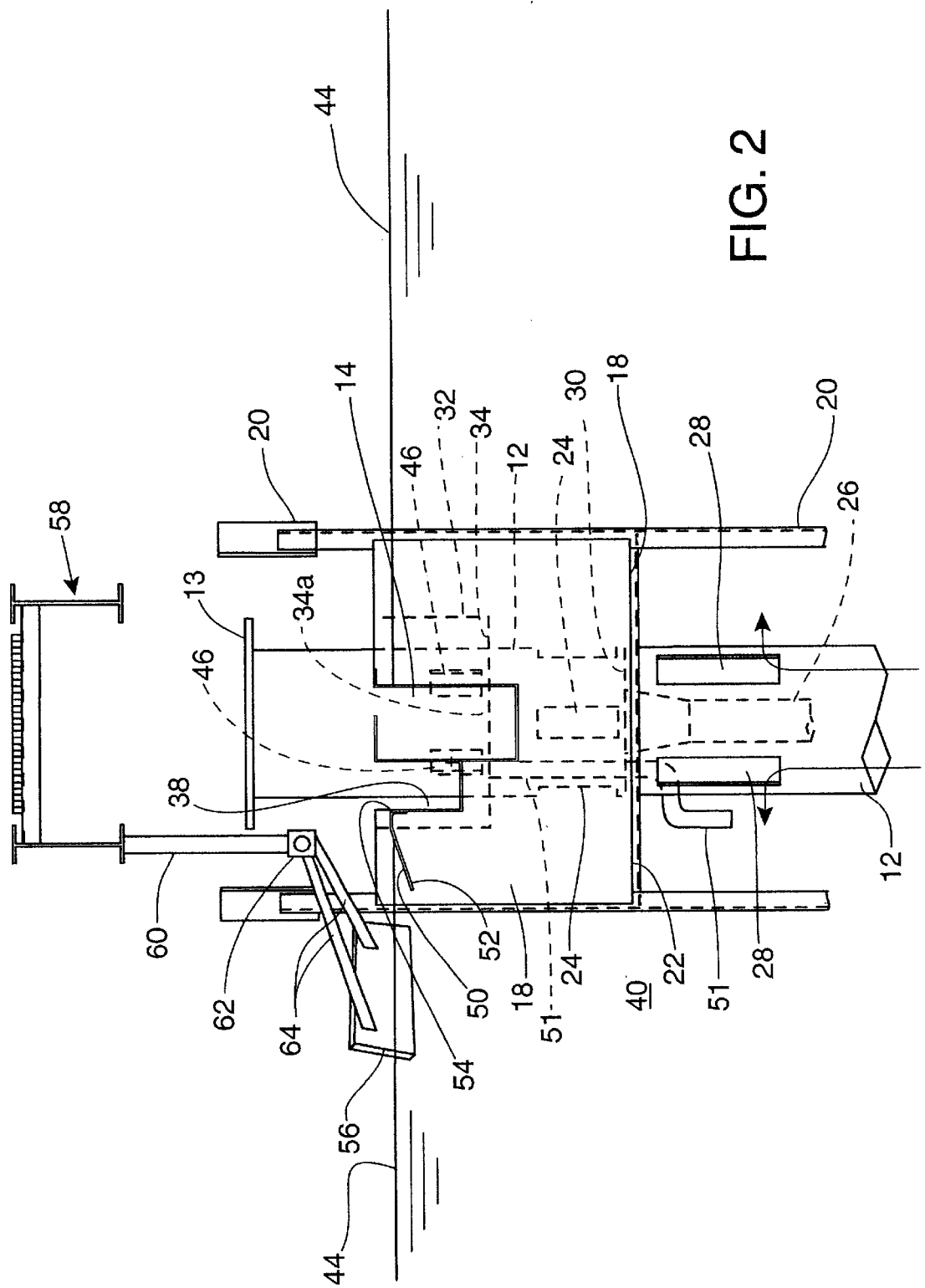

CLARIFIER WITH INFLUENT WELL SCUM REMOVAL

This application is a continuation-in-part of U.S. application Ser. No. 09/232,235, filed Jan. 19, 1999, now U.S. Pat. No. 6,068,134.

BACKGROUND OF THE INVENTION

This invention concerns sewage treatment processes, and in particular relates to scum removal in a clarifier.

In a typical conventional activated sludge sewage treatment process, a considerable volume of scum and other gross floatables enters with the influent feed into the clarifier basin. This is distinct from the biological scum which arises from biological processes occurring in the basin. In conventional clarifiers the influent scum and other floatables were often moved out of the influent well to be collected along with biological scum, over the entire clarifier surface or at the periphery of the clarifier. The two types of scum typically were commingled and discharged together, and where influent well scum and floatables were collected they were delivered to the periphery of the clarifier and commingled with biological scum.

Examples are the SS Clarifiers of Enviroquip, Inc., being of open trough design and having scum ports that move with the rake arms collecting scum and other floatables over the entire clarifier surface, with commingling. Although such systems function well to remove scum from the clarifier, a problem is the volume of water taken in with the scum— sometimes 200 to 300 gallons per minute, producing a very watery, diluted scum which would hydraulically overload the digester or sludge concentration area in the wastewater handling area.

Some prior clarifier systems have had influent wells that prevented egress of scum or gross floatables at the surface. Some have included a fixed scum beach or box within the influent well, with a rotating scraper blade in the well for collecting surface scum and floatables onto the beach or box. Some clarifiers have incorporated rotating open scum troughs extending from center pier to the periphery of the clarifier with ports both inside and outside the influent well. However, even where the scum and floatables were sequestered and collected within the influent well, they were not handled separately from other biological scum for separate discharge and they were not discharged through the center pier.

The following U.S. patents were concerned with sewage treatment and clarifiers and have some relevance to the subject matter of this invention: U.S. Pat. Nos. 1,892,688, 2,295,982, 2,262,412, 2,506,927, 2,661,094, 2,681,151, 2,798,041, 2,801,007, 2,822,928, 2,875,697, 3,132,733, 3,166,502, 3,206,036, 3,216,570, 3,234,880, 3,314,547, 3,327,867, 3,770,131, 3,892,666, 3,926,805, 3,396,102, 3,487,017, 3,526,591, 4,193,877, and 5,219,470.

The prior art did not contemplate the efficient scum removal system of the present invention, in which virtually all scum and other floatables entering the clarifier's influent well are sequestered in the influent well, efficiently collected there in a nearly dry state, then discharged down the center pier and separately from other scum or sludge in the clarifier, for separate subsequent processing.

SUMMARY OF THE INVENTION

In the clarifier system of the invention all access areas at the surface of the influent well are blocked off, and the well is used as a basin and scum containment area. This allows about 90% to 95% of scum to be captured where it enters the clarifier.

Principal innovation of this clarifier system is to expand the function of the influent well to include capturing virtually all inorganic gross floatables and scum inside the influent well, by providing an additional scum collection device within the influent well, and the collection device thus feeding an isolated waste stream which is piped down the center pier for optimal disposal of this waste stream separate from the biological scum collected from the clarifier surface outside the influent well.

Instead of removing scum using a series of scum ports at the leading edge of a sludge removal trough or scum trough as in some prior clarifiers, a preferred embodiment of the clarifier of the invention has within the influent well an inclined scum ramp at the leading edge of each rotating scum removal trough, behind which is the scum collection trough. The clarifier rake arms pass through an arc of rotation, preferably 360°, building up scum and other floatables as the ramps skim the surface. The scum and other floatables accumulate on the surface and at the beach formed by the ramp and are pushed forward by the approach ramp. Once per revolution each moving scum ramp approaches a stationary scum surface blade which is secured to fixed structure above the influent well but which can pivot up when engaged against the ramp.

The scum blade, extending partially under the liquid surface, provides a barrier to the forwardly pushed scum and contacts and slides up the moving ramp, sweeping the scum up the ramp and into the scum collection trough.

This influent well scum collection device is essentially opposite to the rotating blade/fixed scum beach that has been employed in some prior clarifier influent wells. Moreover, even those devices failed to provide for a separate waste stream of the well-collected scum and did not discharge down the center pier.

By reducing the volume of liquid in the scum collection system, the described arrangement greatly reduces the amount of free water with the scum as compared to typical scum port designs. The new system permits the scum in the influent well, including other floatables, to be trapped and contained with little liquid, prior to being disposed of and treated separately from biological scum captured elsewhere in the clarifier basin, and without commingling with sludge or returning to the head of plant.

Although the well scum is efficiently collected using the described scum ramp sweeping the influent well, other systems operable within the influent well, such as ports or slide gates, could alternatively be used. One alternative sometimes preferable is an open trough with scum ports which terminates at the influent well, used in the same clarifier system with a traditional scum box mounted at the periphery of the clarifier to capture biological scum to be handled separately. The open scum trough within the influent well conducts the collected scum and inorganic floatables into a waste stream which exits the center pier separately.

The system of the invention thus provides for a cleaner water surface outside the clarifier's influent well, cleaner effluent from the clarifier, and segregation of gross floatables and scum from biological scum, thereby allowing optimal disposal or use of each waste stream. In addition, the system contains influent well scum even when the scum pumps are idle and provides for very little dilution of gross floatables and scum captured in the influent well.

It is thus among the objects of the invention to make more efficient the operation of a clarifier and other systems in an activated sludge sewage treatment process, by collecting most of the scum of the clarifier system as scum enters the influent well with the influent feed, and by discharging this scum and other floatables in a dedicated stream down through the center pier with very little volume of water. These and other objects, advantages and features of the invention will be apparent from the following description of a preferred embodiment, considered along with the accompanying drawings.

DESCRIPTION OF THE DRAWINGS

FIG. 2 is a schematic elevation view partially in section and as seen along the line 2—2 in FIG. 1, showing equipment in the central portion of the clarifier, including the drive cage frame, influent and exit ports and conduits for activated sludge and scum, and the scum removal apparatus of the invention.

DESCRIPTION OF PREFERRED EMBODIMENTS

Figure 1:
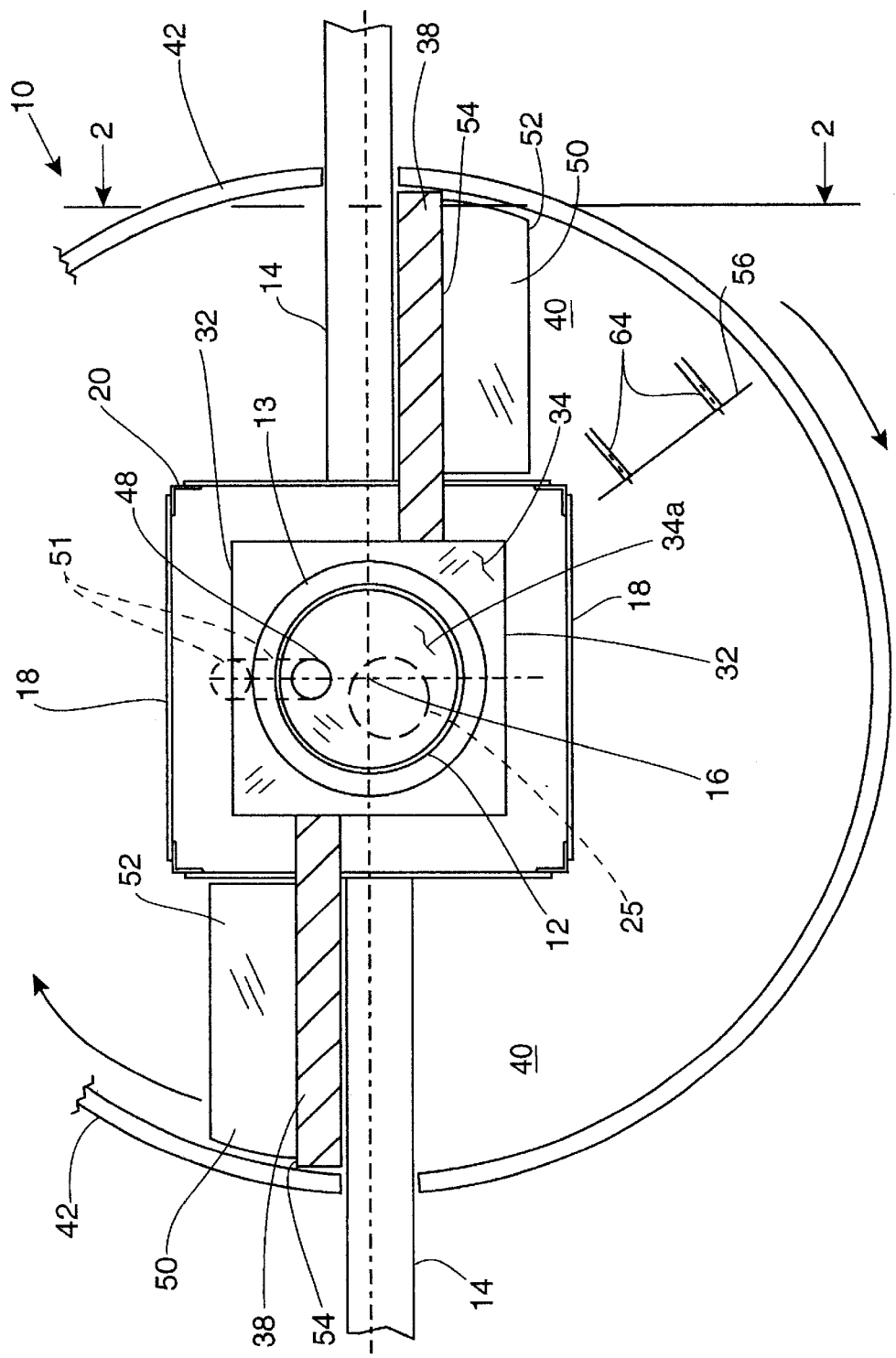
FIG. 1 is a plan view schematically illustrating a central portion of a clarifier basin including an influent well, rotatable drive cage and the scum collecting innovation of the invention.

In the drawings, the plan view of FIG. 1 shows a central area 10 of a clarifier basin, the basin itself being much larger than what is seen in the drawing, as in conventional clarifier basins having a central influent well.

The clarifier's central area 10, as seen in both FIGS. 1 and 2, includes an influent center pier column 12 which is stationary and solidly secured to fixed structure at the base of the clarifier basin, such as concrete, and as in other conventional clarifiers, it supplies support for equipment which sweeps around the preferably circular basin to aid in the clarifying function. The pier column 12 may have a top annular flange 13. FIG. 1 shows a pair of return activated sludge troughs 14, extending in opposite directions generally radially away from the center pier column 12, each sludge trough forming a part of a rake arm which rotates around the clarifier basin about a center of rotation 16. The return activated sludge troughs 14 are connected to and supported at least in part by a return activated sludge (RAS) collection box 18 which is secured to a drive cage frame 20, portions of which are seen in FIG. 2. The drive cage frame 20 is driven in a slow rotation about the center pier column 12, by equipment of a type which is well known and commonly used in conventional clarifiers, including a rotating device (not shown) mounted on top of the center pier column 12.

FIG. 2 shows the RAS collection box 18 with interior equipment shown in dashed lines. The influent pier column 12 continues up through the RAS collection box, and where the column 12 penetrates the bottom 22 of the RAS collection box, a seal is provided between the pier and the central hole in that bottom panel 22. Such seals are well known in clarifier equipment.

As seen in FIG. 2, within the interior space of the RAS collection box are PAS return ports 24 on the center pier column, for allowing sludge collected in the collection box to pass by gravity into the center pier column, to be discharged down a drain hole 25 (dashed lines FIG. 1) and through an RAS removal pipe 26 which may be at or near the center of the pier column as shown. At the same time, influent sludge is fed up through the influent center pier column 12, in the space surrounding the RAS removal pipe 26, to be initially discharged into the clarifier through influent feed ports 28. That portion of the influent center pier column has a ceiling 30 surrounding the top of the RAS removal pipe 26, also serving as a floor for the chamber above, with the RAS drain hole 25 being in that floor.

Above the RAS return ports 24 is a scum collection box 32 that rotates with the RAS collection box, having a floor at 34, separating this scum collection area from the RAS collection box 18 below. A floor 34a in the stationary center pier column appears at about the same level as the scum box floor 34, although it could be lower. The outer floor 34 rotates, being engaged with the exterior of the center pier column in a rotary seal (not specifically shown).

The scum collection box 32 receives scum from scum collection troughs 38 which extend from the scum collection box 32 generally radially and only within the confines of an influent well 40 defined by an influent flocculation skirt 42 (seen in FIG. 1). The skirt 42 is circular or essentially circular in shape and rotatable with the RAS collection box 18, scum collection box 32 and rake arms, of which the RAS troughs 14 form a part. The influent flocculation skirt 42 is not shown in FIG. 2, but FIG. 1 shows that it extends an essentially full circle to define the influent well 40, broken only by the RAS troughs 14 that extend substantially to the far reaches of the clarifier basin. As is typical of an influent flocculation skirt in a clarifier, the skirt 42 extends from above the surface of the water and sludge (surface shown at 44 in FIG. 2) down to several feet above the bottom of the clarifier basin. The influent well typically is about four to eight feet in depth.

Scum collected in the scum collection troughs 38, shown in FIG. 2 as secured to the return sludge collection troughs 14, flows inwardly toward the center pier column and into the scum collection box 32, where it is collected on the floor 34 of the scum collection box, radially outwardly of the center pier column as can be seen particularly from FIG. 1. By its own accumulation and gravity, the scum then pours through scum return ports 46 into the interior of the center pier column, to an internal scum accumulation area. From both FIGS. 1 and 2 it can be seen that the scum then flows out of this storage area on the internal floor 34a of the center pier column via a drain 48 and connected scum removal pipe 51 that ultimately takes the scum effluent to the exterior of the center pier column, for separate treatment. Such separate collection and discharge, without commingling with either biological scum collected elsewhere in the clarifier or sludge, is an important feature of the invention.

As explained above, the clarifier apparatus of the invention collects scum and other gross floatables which initially enter the clarifier through the influent feed ports 28 in the center pier column, and contains them within the influent well 40. This is in contrast with many other systems which deliver the scum along with the influent feed throughout the volume of the clarifier basin, or which collect well scum and biological scum in a common scum trough. A very large percentage of total scum which appears within the clarifier is present in the influent feed, and since the scum and other floatables will float to the surface, they can be contained within the influent well, by the influent skirt 42. Some prior systems have contained the scum in an influent well, and even collected the scum and floatables there, but then have piped the scum and floatables to other areas of the clarifier to be commingled with biological scum.

As the rake arms, RAS troughs 14, scum troughs 38 and influent skirt 42 rotate with the RAS collection box 18 about the center pier column 12, a scum ramp 50 of this preferred embodiment, associated with each rake arm and preferably connected to each scum collection trough 38 (FIG. 2), sweeps forward in an arc through the influent well. Each scum collection ramp 50 forms a beach, being angled and with a lower lip 52 below the liquid surface and an upper edge 54 above the liquid surface. FIG. 2 shows this clearly, with the liquid surface 44 approximately midway up the ramp in the illustrated embodiment. This can vary, the important consideration being that the lower lip 52 of the scum ramp be below the surface sufficiently to gather all floating debris, including scum. The liquid surface 44 should not be so high up the ramp as to pour liquid into the scum collection troughs 38.

As the scum ramps 50 sweep through the influent well 40, they accumulate scum and other floatables against the ramp, these floatables continuing to be pushed forward in an arcuate path by each ramp. The ramps thereby gather virtually all floating scum and debris, accumulating them in front of the ramp. To collect this floating material into the scum collection troughs 38, a scum surface blade 56 is provided. The blade 56, necessarily supported from above so as to allow passage of the rake arms, RAS troughs 14 and the scum collection troughs themselves, is secured to fixed structure such as the access beam bridge 58 of the clarifier, illustrated in part in FIG. 2 for this preferred embodiment.

As FIG. 2 shows, a fixed structural frame member 60 can extend down from a part of the access beam bridge, to a pivot connection 62. From there, the scum surface blade 56 is supported on one or more pivot arms 64, in a manner that fixes a lower limit, normal position of the blade but allows it to swing upwardly about the pivot 62 when forced upwardly. This occurs when the scum surface blade 56 encounters the inclined scum ramp 50. At that point the blade 56 has trapped the advancing accumulated scum and debris, causing it to build up more densely against the scum ramp and to gather together somewhat. When the scum surface blade 56 encounters the ramp, the ramp cams the scum blade to pivot upwardly and ride up the ramp, thus sweeping the accumulated and gathered debris up and over the ramp into the scum collection trough 38. In a preferred form of the invention, this occurs once per revolution, there being one scum surface blade within the influent well. The blade may be formed of an elastomeric, rubbery material so that it passes over the scum trough 38 and the RAS trough 14 without difficulty.

By this efficient scum removal system an effluent of scum/floatables is produced with very little free water.

Figure 3:
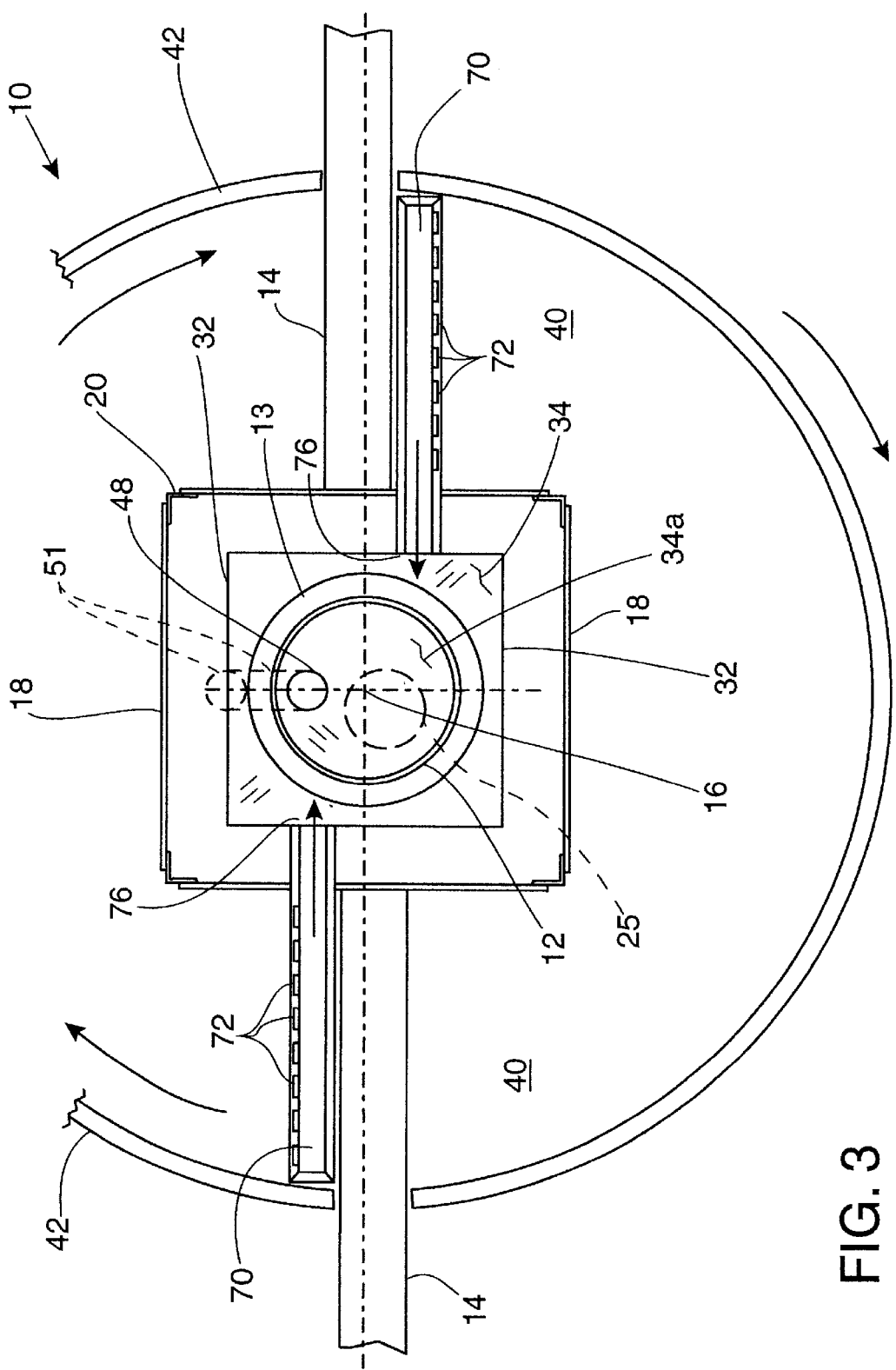
FIG. 3 is a plan view similar to FIG. 1, showing another form of scum collection in the influent well.

In another embodiment of the invention, scum and gross floatables are again collected within the influent well, and are discharged separately from sludge and biological scum collected elsewhere in the clarifier, but the scum collection device within the influent well is different. FIG. 3, somewhat similar to FIG. 1, shows an alternative arrangement which does not include the scum ramp or beach 50 and the scum surface blade 56 illustrated in FIGS. 1 and 2. In this embodiment, a scum collection device comprises an open scum collection trough 70 with scum ports 72. The scum trough 70 extends only within the influent well 40, bounded by the influent flocculation skirt 42, and preferably is secured to the return activated sludge trough 14 as in the previous embodiment, at the leading side of the sludge trough 14 as the rake arms and troughs 14 rotate. One such open scum collection trough 70 is included on each side of the center pier in a preferred embodiment. The open scum collection troughs 70 have inner ends 76 which open into and deliver scum into a scum collection box 32 as in the previous embodiment. Accumulation of the scum within the box 32, and discharge of the scum and floatables through the center pier column, preferably is the same as in the previously described embodiment, including a scum removal pipe 51. The difference is that the open scum troughs 70 take in a considerable volume of water along with the scum and gross floatables, thus producing a more diluted discharge. However, the discharge nonetheless forms a separate stream from collected sludge and from biological scum collected in other regions of the clarifier outside the influent well. Such separate collection and discharge is an important feature of the invention.

Figure 1A:
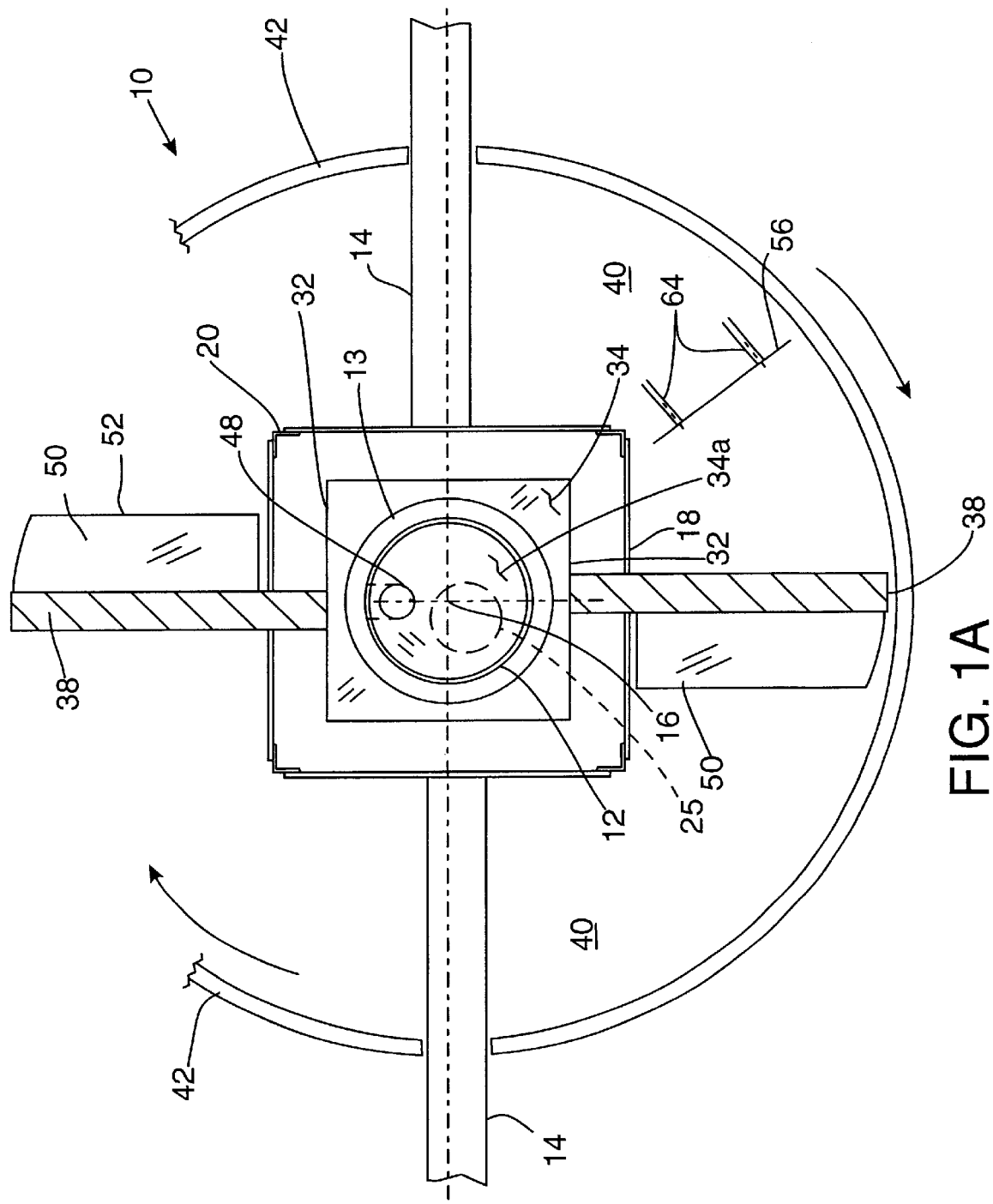
FIG. 1A is a view similar to FIG. 1, but showing a variation in location of certain scum collection components.

FIG. 1A shows a variation to what is shown in FIGS. 1, 2 and 3, in the location of the scum collection troughs 38 and the attached scum ramps or beaches 50. This variation should be considered as applying equally to the embodiment shown in FIG. 3, wherein such ramps are not included.

FIG. 1A illustrates that the scum collection troughs 38 need not be adjacent to and essentially parallel to each rake arm 14 as shown in FIGS. 1, 2 and 3. Rather than being secured to the rake arms, the scum collection troughs 38 can extend in a different direction from the rake arms, still extending generally radially outwardly from the drive cage, as shown. Other directions are possible, as desired, since the scum collection troughs 38 need not be angularly equidistant from the two rake arms 14.

The influent well 40 of the clarifier system of the invention has an additional benefit over prior clarifiers. Since the influent flocculation skirt 42 is essentially fully closed, from above the surface of the liquid to below the liquid surface, it will contain foam which builds up within the influent well. This is contrasted with prior influent wells which permitted scum to flow outwardly throughout the surface of the clarifier. The added benefit here is that the scum is essentially fully contained within a small area in the center of the clarifier basin, and can much more easily be treated and controlled from this inner region. Some foam is caused by certain bacteria, and other foam is caused by other sources. With the arrangement of the invention, the foam can be treated, either with bacteria-killing agents or with other anti-foaming agents, solely from within the influent well area. Thus, efficient and effective scum control in the clarifier basin is achieved according to the invention by (a) providing a skirt which closes off the outward movement of scum, the great majority of which occurs within the influent well, and (b) treating scum solely within the influent well, thus eliminating any need to apply foam control agents or anti-bacteria agents for purpose of controlling foam within the large remaining area of the clarifier, outside the influent well.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. A method for controlling foam caused by bacteria or other sources in a clarifier basin of a sewage treatment system, comprising:

providing an influent well in a central region of the clarifier basin, the influent well being defined by an influent flocculation skirt surrounding an influent center pier column and drive cage, the skirt extending above and below the liquid surface in the clarifier basin so as to provide a closed barrier which essentially contains any foam which builds up on the surface of the liquid within the influent well, and during operation of the clarifier basin, spraying the foam contained within the influent well, with either a bacteria-killing agent or an anti-foaming agent in order to control the foam, whereby foam in the clarifier basin is controlled from the relatively small area of the influent well, eliminating the need to actively control foam outside the influent well.

* * * * *